Nov. 14, 1939.  K. IMHOFF  2,180,148
AERATING TANK
Filed June 21, 1937
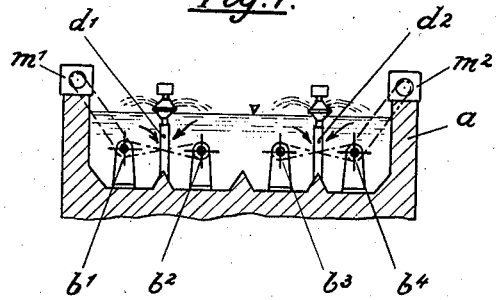
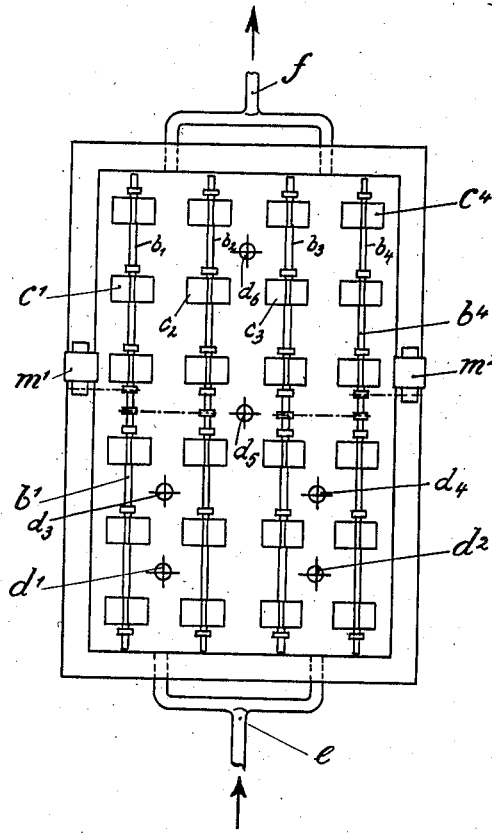
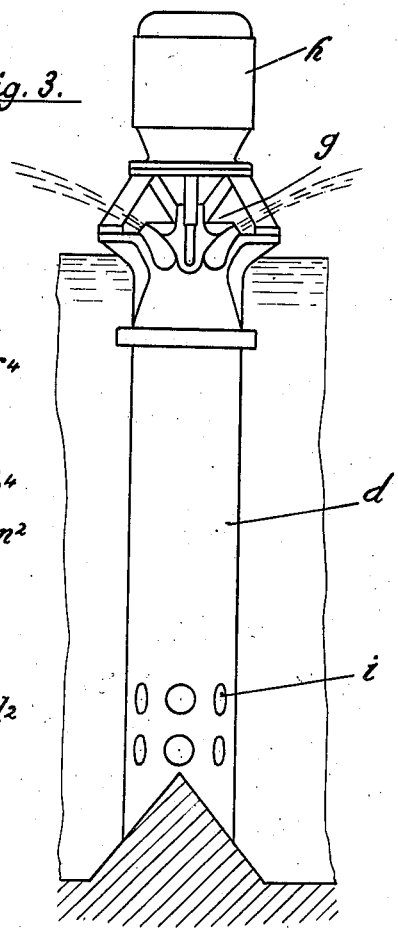
INVENTOR
KARL IMHOFF
ATTORNEY Patented Nov. 14, 1939

2,180,148

UNITED STATES PATENT OFFICE 2,180,148

AERATING TANK

Karl Imhoff, Essen, Germany

Application June 21, 1937, Serial No. 149,445
In Germany July 3, 1936

2 Claims. (Cl. 210—8)

This invention relates to aerating tanks and more particularly to a novel construction of such tanks for systems of treating sewage or trade waste by activated sludge in order to again supply to the sewage the air that had been consumed by the bacteria. During the treatment with air the sewage in the tank must be agitated in such a manner that the sludge particles contained therein are caused to remain in condition of suspension and prevented against depositing on the bottom of the tank, as otherwise the activated sludge particles would perish at this place for want of air.

Heretofore the aeration of tanks of this kind had been effected by blowing air thereinto or by causing a spraying of the liquid above the tank by means of air. In such case the devices serving for the aeration of the tank had simultaneously been used also for agitating the liquid within the tank or the devices serving to agitate the liquid had been properly operated to also effect the spraying. In such case, however, neither the aerating devices nor the agitating devices are able to properly perform both functions with the result that a drawback had arisen in the one or the other way or that an excessive power had been necessary to operate the plant.

According to my invention, now, the aerating tank is provided with a combination of two devices, one serving for agitating and the other for spraying the liquid. Although both of said devices are known individually, the combination of both devices results in a particular improvement of the operation of the plant.

The least expensive device for agitating the sewage liquid in the tank has been found to consist in paddle-wheels mounted to rotate within said liquid, the peripheral velocity of rotation of said paddle-wheels amounting to about 15 cm. per second. On the other hand, paddle-wheels cannot properly be used for the aeration, as the peripheral velocity of paddle-wheels would become excessive when used for this purpose. The most convenient device for aerating the sewage, on the other hand consists of a pipe arranged in vertical direction and provided with an impeller mounted to rotate about a vertical axis, said impeller serving to pass the sewage liquid from the tank through said pipe and to spray said liquid above the level of the tank. An aerating device of this kind requires but a very small amount of power, if said device is restricted to perform the aeration alone and not simultaneously used to agitate the whole of the sewage to prevent particles of the latter against depositing on the bottom of the tank.

Accordingly, my invention has for its primary object to provide an aeration tank with paddle-wheels serving solely for agitating the sewage in the tank and, in addition with impellers rotating about a vertical axis and serving solely for aerating the sewage. An aerating tank of this kind has the advantage that proper operation of the plant may be combined with a minimum of power required therefor. The aforesaid vertical pipes provided with the impellers are preferably distributed over the aeration tank in such a manner that said pipes are arranged at smaller distances from each other near the supply end of the tank than at the other places thereof.

In the accompanying drawing which forms part of this specification I have represented an example of construction of an aerating tank provided with my novel aerating and agitating devices. In the drawing, Fig. 1 shows an aeration tank in section and the novel agitating and aerating devices therein in view, while Fig. 2 is a top-view taken on Fig. 1 and Fig. 3 an enlarged side-view of one of the aforesaid vertical pipes and impellers connected therewith.

Referring more particularly to the drawing, several rows of paddle-wheels $c_1$, $c_2$, $c_3$ and $c_4$ are mounted on the shafts $b_1$, $b_2$, $b_3$ and $b_4$, respectively, and arranged within the aeration tank $a$. The paddle-wheels $c_1$ and $c_2$ are driven in opposite directions of rotation by a motor $m_1$, while the paddle-wheels $c_3$ and $c_4$ are likewise driven in opposite directions of rotation by a motor $m_2$. Intermediate the several rows of paddle-wheels $c_1$, $c_2$, $c_3$ and $c_4$ are mounted the vertical pipes $d_1$, $d_2$, $d_3$, $d_4$, $d_5$ and $d_6$, the pipes $d_1$, $d_2$, $d_3$ and $d_4$ being positioned near the supply end, that is near the supply pipe $e$ of the tank. At the exit end of the tank there is provided a pipe $f$ through which the sewage is discharged from the tank after treatment. As shown in Fig. 3, each of the pipes $d$ is provided with an impeller $g$ mounted at the upper end of the pipe and driven by a motor $h$. Each pipe $d$ is furthermore provided at its under part with apertures $i$, as shown in Fig. 3.

The sewage ascending in the pipes $d$ will be sprayed in direction over the surface of the sewage in the tank by action of the rapidly rotating impellers $g$ and thus brought into intimate contact with air. At the portion of the tank near the supply end the greatest amount of air will be required for the aeration, this being due to the fact that at this place there is the greatest amount of soiling matter in the sewage. For this reason a greater number of pipes $d$ are mounted near the supply end of the tank. The paddle-wheels $c$ rotate at a smaller speed and have solely the purpose of preventing sludge from depositing at the bottom of the tank.

Since both kinds of devices, viz. the aerating and the agitating devices, that is the impellers $g$ and the paddle-wheels $c$, operate under most favorable conditions of operation, the amount of power for operating the plant will be very small. Owing to the individual drive for each of the impellers $g$ there will be the further advantage that during different hours of the day and night the supply of air may be adapted to the varying degree of soiling matter present in the sewage by putting the several impellers $g$ into and out of operation in accordance with the temporary demand. In case of a supply of sewage in the form of pure waste water the impellers $g$ may at night time even be entirely put to standstill, while the slight motion necessary for agitating the sewage will be effected by the paddle-wheels independently of the impellers.

I claim:

1. In an aerating tank for the treatment of sewage by activated sludge, having supply and discharge means for the sewage, and having a substantially flat bottom, the combination of a plurality of rows of paddle wheels arranged longitudinally of the tank near said bottom, means for rotating at relatively slow speed said paddle wheels for agitating the sewage in said tank to cause the sludge particles to remain in a condition of suspension and prevented from depositing on the bottom of the tank where the activated sludge particles would perish for want of air, a plurality of vertical impeller pipes adapted to draw the agitated sewage from the tank, disposed intermediate said paddle wheels, and operative independently thereof, impellers on said pipes above the sewage level to spray the sewage so drawn into the air above the tank, to return aerated to the tank and be mixed and mingled with the sewage in the tank while under agitation by the paddle wheels, and means for rotating the impellers at relatively high speed whereby the contents of the tank is aerated to enable the activated sludge to do its work.

2. In an aerating tank for the treatment of sewage by activated sludge, having supply and discharge means for the sewage, the combination of a plurality of rows of paddle wheels arranged longitudinally of the tank, each of a pair of adjacent rows moving in opposite directions, means for rotating said paddle wheels at relatively low speeds for agitating the sewage to cause the sludge particles to remain in a condition of suspension and prevented from the depositing on the bottom of the tank where the activated sludge particles would perish for want of air, and to move the sludge to the space between the paddle wheels, a plurality of vertical impeller pipes adapted to draw the agitated sewage from the tank, disposed intermediate said paddle wheels, and impellers on said pipes above the sewage level in line with the meeting of the sludge of said oppositely driven paddle wheels, to spray the sewage so drawn in the air above the tank, to return aerated to the tank and be mixed and mingled with the sewage in the tank while under agitation by the paddle wheels, and means to rotate the impellers at relatively high speed, whereby the contents of the tank is aerated to enable the activated sludge to do its work, the impeller pipes being disposed in greater number near the supply end of the tank than at the discharge end thereof.

KARL IMHOFF.